United States Patent
Fukuda

(10) Patent No.: US 9,919,947 B2
(45) Date of Patent: Mar. 20, 2018

(54) METHOD FOR CONTROLLING DIAMETER OF GRIN LENS FIBER AND FIBER DRAWING EQUIPMENT

(75) Inventor: Toshiaki Fukuda, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 364 days.

(21) Appl. No.: 13/257,482

(22) PCT Filed: Mar. 30, 2009

(86) PCT No.: PCT/JP2009/056438
§ 371 (c)(1),
(2), (4) Date: Sep. 19, 2011

(87) PCT Pub. No.: WO2010/116438
PCT Pub. Date: Oct. 14, 2010

(65) Prior Publication Data
US 2012/0114285 A1  May 10, 2012

(51) Int. Cl.
*C03B 37/025* (2006.01)
*G02B 6/028* (2006.01)

(52) U.S. Cl.
CPC .......... *C03B 37/0253* (2013.01); *G02B 6/028* (2013.01); *C03B 2203/26* (2013.01); *C03B 2205/40* (2013.01); *Y02P 40/57* (2015.11)

(58) Field of Classification Search
CPC ................................................ C03B 37/0253
(Continued)

(56) References Cited

U.S. PATENT DOCUMENTS 4,195,980 A * 4/1980 Sterling ................ C03B 23/207
156/153
4,793,840 A * 12/1988 Harding .......................... 65/381
(Continued)

FOREIGN PATENT DOCUMENTS

JP      9-124335      5/1997
JP     10-167745      6/1998
(Continued)

OTHER PUBLICATIONS

International Search Report dated May 19, 2009 in International (PCT) Application No. PCT/JP2009/056438.
(Continued)

*Primary Examiner* — John Hoffmann
(74) *Attorney, Agent, or Firm* — Wenderoth, Lind & Ponack, L.L.P.

(57) ABSTRACT

When a GRIN lens fiber is drawn from a preform, control of a fiber diameter is improved in order to increase a production yield of the GRIN lens fiber having a fiber diameter within a desired range. The problem is solved by controlling the drawing speed using a fiber diameter c, which is obtained by correcting a fiber diameter a using the fiber diameter b and a fiber diameter α. The fiber diameter a is measured using a diameter measuring instrument A that measures an outer diameter of the GRIN lens fiber, which is being elongated inside a heating furnace, the fiber diameter b is measured using a diameter measuring instrument B that measures an outer diameter of the GRIN lens fiber outside the heating furnace, and the fiber diameter α is a value of the fiber diameter a measured a specified period of time T earlier.

4 Claims, 4 Drawing Sheets

(58) Field of Classification Search
USPC .................................................. 65/382, 491
See application file for complete search history.

(56) References Cited

U.S. PATENT DOCUMENTS

| | | | |
|---|---|---|---|
| 5,073,179 A * | 12/1991 | Yoshimura et al. | 65/382 |
| 5,314,517 A * | 5/1994 | Koening et al. | 427/163.1 |
| 5,443,610 A * | 8/1995 | Urruti | 65/486 |
| 5,449,393 A * | 9/1995 | Tsuneishi et al. | 65/377 |
| 6,098,428 A * | 8/2000 | Bogdahn et al. | 65/381 |
| 6,178,778 B1 * | 1/2001 | Kenmochi et al. | 65/381 |
| 6,324,326 B1 * | 11/2001 | Dejneka et al. | 385/123 |
| 6,553,791 B1 * | 4/2003 | Osaka et al. | 65/407 |
| 6,620,350 B2 * | 9/2003 | Chen | 264/1.24 |
| 2002/0066292 A1 * | 6/2002 | Wang | 65/382 |
| 2002/0078715 A1 * | 6/2002 | Ishihara | C03B 37/027 65/477 |
| 2003/0024272 A1 * | 2/2003 | Naka et al. | 65/379 |
| 2003/0024276 A1 * | 2/2003 | Anderson et al. | 65/390 |
| 2005/0126227 A1 * | 6/2005 | Collaro | 65/378 |

FOREIGN PATENT DOCUMENTS

| | | |
|---|---|---|
| JP | 11-139843 | 5/1999 |
| JP | 2005-115097 | 4/2005 |
| JP | 4084838 | 2/2008 |

OTHER PUBLICATIONS

International Search Report dated May 19, 2009 in International (PCT) Application No. PCT/JP2009/056438, three total pages.
Japanese Office Action dated Aug. 1, 2012 in corresponding Japanese Patent Application No. 2009-522258, together with English translation thereof, four total pages.
International Search Report dated May 19, 2009 in International (PCT) Application No. PCT/JP2009/056438, 3 pages total.
Japanese Office Action dated Aug. 1, 2012 in corresponding Japanese Patent Application No. 2009-522258, together with English translation thereof, 4 pages total.
Japanese Office Action dated Aug. 1, 2012 in corresponding Japanese Patent Application No. 2009-522258, together with English translation thereof.

* cited by examiner

METHOD FOR CONTROLLING DIAMETER OF GRIN LENS FIBER AND FIBER DRAWING EQUIPMENT

TECHNICAL FIELD

The present invention relates to a method for controlling a fiber diameter and equipment for drawing a GRIN lens fiber used when the GRIN lens fiber is drawn from a preform.

BACKGROUND ART

A so-called GRIN lens is a cylindrical graded index lens (GRaded INdex lens) having a refraction index distribution within glass so as to bend a traveling direction of light, thereby realizing the function of the lens. Typically, the GRIN lens is cut into pieces of less than about 1 mm, each of which is fused to the tip of an optical fiber, and used in a variety of applications in optical systems for optical communications. Today, there is a demand for GRIN lenses having high NA (numerical aperture). Preforms of such GRIN lenses are fabricated in a sol-gel method as disclosed in Patent Document 1 below and the like. A preform that is fabricated using the sol-gel method has a cylindrical shape whose diameter and length are respectively about 5 mm and 30 to 50 mm at the minimum. This size is very small compared to that of a preform for an ordinary optical fiber.

When the preform is drawn into the GRIN fiber lens, a fiber diameter is controlled as follows. That is, a diameter measuring instrument that measures the fiber diameter of the drawn GRIN lens fiber is provided outside a heating furnace that heats the preform so as to elongate the preform. A measured value (fiber diameter) is transmitted to an automatic controller and used to control a drawing speed such that the fiber diameter becomes closer to a target value.

Patent Document 2 below discloses a method for controlling an outer diameter of a preform when a silica glass ingot for an optical fiber is elongated so as to form a preform. According to this technology, diameter measuring instruments are provided at two positions in the middle of a part of the preform being elongated in a heating furnace. An elongation speed is controlled on the basis of outer diameters of the preform measured at the two positions.

Patent Document 1: Japanese Unexamined Patent Application Publication No. 2005-115097
Patent Document 2: Japanese Unexamined Patent Application Publication No. 10-167745

DISCLOSURE OF INVENTION

Problems to be Solved by the Invention

Typically, in drawing an optical fiber, a fiber diameter is measured at a position away from a heating furnace so as to measure an outer diameter that has been stabilized. The drawing speed is controlled in accordance with the measured value so as to draw a fiber having a constant outer diameter. The size of the preform of the optical fiber is φ30 to 80 mm in diameter, φ150 mm in diameter for a large preform, and 1 to 1.5 m in the entire length. With consideration of operation time and the like, the drawing speed is frequently several hundred m/minute, and accordingly, it is supposed that the optical fiber reaches the diameter measuring instrument in less than a second from the heating furnace even when the heating furnace and the diameter measuring instrument are spaced away from each other by about several meters.

Likewise, in a process for drawing a GRIN lens, the diameter measuring instrument is also disposed outside the heating furnace. However, the size of the preform of the GRIN lens is sometimes less than 1% of that of the optical fiber at the minimum, and the drawing speed thereof is several m/minute. Even when the diameter measuring instrument is disposed at a position closest to the heating furnace, the distance between the center of the heating furnace and the diameter measuring instrument is 200 mm. This means that there is a delay of several seconds between the elongation of the preform and the measurement of the fiber diameter when the preform is drawn at a normal speed. The fiber diameter control cannot be suitably performed on the basis of measured values obtained in this method, and accordingly, the yield is not desirable.

To overcome the above situation, in order to allow measurement of the fiber diameter in a timing when the elongation of the GRIN lens fiber has been almost completed in the heating furnace, a diameter measurement is performed using a method as follows. That is, through a hole formed on a side surface of the furnace body, the fiber diameter is measured using an image processing system having a camera. However, a depth of focus decreases due to the distance to a target (a fiber), an angle of field, the precision of the lens, and the like. Accordingly, it is not easy to focus on the target. In addition, due to convection of an inert gas used to purge the heating furnace, a neck-down position, resonance of the GRIN lens fiber being drawn, and the like, the position of the GRIN lens fiber, which is the target of the measurement, may not be constant. Accordingly, it may be difficult to correctly measure the fiber diameter.

There are light-blocking type dimension measuring devices and the like other than the camera type. However, none of such devices perform high-precision measurement when a light emitter and a light receiver are spaced apart so as to be positioned at one and the opposite sides of the heating furnace. Thus, those devices are regarded as unsuitable to measurement and control of the fiber diameter in the heating furnace and introduction of those devices are difficult.

The technology in the above-described Patent Document 2 controls the elongation speed on the basis of measured outer diameter values of the preform at two positions. Outer diameter measuring devices at the two positions each measure the outer diameter inside the heating furnace. However, in this case, a target of measurement is φ30 to 80 mm, which is large. Accordingly, it is easy to capture an image of the target, and the measurement is less affected by an environment inside the furnace such as turbulence of a purge gas.

An object of the present invention is to improve control of a fiber diameter when a GRIN lens fiber is drawn from a preform in order to increase a production yield of the GRIN lens fiber having a fiber diameter within a desired range.

Means for Solving the Problems

The present invention is a method for controlling a diameter of a GRIN lens fiber. In the method, an outer diameter of the GRIN lens fiber is controlled so as to, when the GRIN lens fiber is drawn from a preform, make the outer diameter match a specified diameter. In the method, a drawing speed is controlled on the basis of a fiber diameter a that is measured using a diameter measuring instrument A that measures the outer diameter of the GRIN lens fiber, which is being elongated in a heating furnace, and a fiber diameter b that is measured using a diameter measuring instrument B that measures the outer diameter of the GRIN lens fiber outside the heating furnace.

Specifically, in the controlling method based on the fiber diameter a and the fiber diameter b, the drawing speed may be controlled using a fiber diameter c, which is obtained by correcting the fiber diameter a using the fiber diameter b and a fiber diameter α. In this case, the fiber diameter a is measured using the diameter measuring instrument A that measures the outer diameter of the GRIN lens fiber, which is being elongated inside the heating furnace, the fiber diameter b is measured using the diameter measuring instrument B that measures the outer diameter of the GRIN lens fiber outside the heating furnace, and the fiber diameter α is a value of the fiber diameter a measured a specified period of time T earlier. In this case, the fiber diameter c is transmitted to an automatic controller, thereby allowing automatic control to be performed so as to make the fiber diameter close to a target value.

Since the fiber diameter a is a measurement of the fiber diameter inside the heating furnace, it is incorrect because of the above-described reasons. In contrast, the fiber diameter b is positioned outside the heating furnace, and measured under conditions compliant with specifications of the measuring device, and accordingly, should be a correct value. When the distance between the diameter measuring instrument A and the diameter measuring instrument B is determined, and the drawing speed is the normal speed, a fiber diameter measured using the diameter measuring instrument B at a certain time is close to the fiber diameter α, which is a value measured using the diameter measuring instrument A a specified period of time T before the certain time. Thus, by comparing the fiber diameter b and the fiber diameter α, the degree of error in the fiber diameter a, which is a value measured using the diameter measuring instrument A, can be recognized. By correcting the fiber diameter a using the fiber diameter b and the fiber diameter α, the fiber diameter c, which is the fiber diameter of an actually drawn part (inside the heating furnace) can be measured with high precision.

Specifically, the fiber diameter c, which is a corrected fiber diameter a, may be given by the following expression:

fiber diameter $c$=fiber diameter $a$+fiber diameter $b$−fiber diameter $\alpha$ In the expression, (fiber diameter b−fiber diameter α) represents a difference between the diameter measuring instrument B (a correct measured value) and the diameter measuring instrument A (an incorrect measured value), both of which measure almost the same part of the GRIN lens fiber, that is, a measurement error of the diameter measuring instrument A (difference D). By adding the difference D to the fiber diameter a, the measured value using the diameter measuring instrument A (the incorrect measured value) is corrected and becomes closer to the correct value.

Specifically, when the distance in a GRIN lens fiber path between a measurement position of the diameter measuring instrument A and a measurement position of the diameter measuring instrument B is d mm, and the drawing speed is V in mm/second, the specified period of time T may be given by the following expression:

$(d-20)/V \leq T \leq (d+20)/V$

The "distance in a GRIN lens fiber path" is a length of the GRIN lens fiber between the measurement position (the center of the measurement position) of the diameter measuring instrument A and the measurement position (the center of the measurement position) of the diameter measuring instrument B.

When T=d/V, the fiber diameter α is a measured value using the diameter measuring instrument A at a position that is completely the same as the position of the GRIN lens fiber that is measured using the diameter measuring instrument B. Although this is most preferable, since the drawing speed varies in accordance with the control, it is difficult that T=d/V completely holds. When T falls within (d±20)/V, the distance in the GRIN lens fiber between the measurement positions of the fiber diameter b and the fiber diameter α is within ±20 mm. Thus, correct fiber diameter control can be performed substantially without problems.

In order to further reduce the error, the drawing speed may also be controlled using the fiber diameter c that is obtained as follows. That is, the drawing speed at a time when a signal is received is detected, the specified period of time T is calculated from the speed, and the fiber diameter c is obtained by correcting the fiber diameter a using the fiber diameter b, which is a measured value at the time using the diameter measuring instrument B, and a fiber diameter α, which is a measured value using the diameter measuring device A measured at a time a specified period of time T earlier than the time when the signal is received.

Specifically, PI control or PID control, which is one of the most common methods for automatic control, may be used as the method for controlling the drawing speed.

According to the present invention, equipment for drawing a GRIN lens includes a diameter measuring instrument A that measures an outer diameter of a GRIN lens fiber, which is being elongated inside a heating furnace, and a diameter measuring instrument B that measures the outer diameter of the GRIN lens fiber outside the heating furnace. The equipment for drawing a GRIN lens controls a drawing speed on the basis of a fiber diameter a that is measured using the diameter measuring instrument A and a fiber diameter b that is measured using the diameter measuring instrument B.

This is the equipment for drawing a GRIN lens for performing the method for controlling a diameter of a GRIN lens fiber.

Specifically, control based on the fiber diameter a and fiber diameter b may include a correction device and an automatic controller. In this case, the correction device transmits a fiber diameter c to the automatic controller. The fiber diameter c is obtained by correcting the fiber diameter a using the fiber diameter b and a fiber diameter α. The fiber diameter a is measured using the diameter measuring instrument A that measures the outer diameter of the GRIN lens fiber, which is being elongated inside the heating furnace, the fiber diameter b is measured using the diameter measuring instrument B that measures the outer diameter of the GRIN lens fiber outside the heating furnace, and the fiber diameter α is a value of the fiber diameter a measured a specified period of time T earlier. In this case, the automatic controller can perform automatic control of the drawing speed so as to make the fiber diameter close to a target value.

This is the equipment for drawing a GRIN lens for performing the method for controlling a diameter of a GRIN lens fiber.

Specifically, the fiber diameter c, which is a corrected fiber diameter a, may be given by the following expression:

fiber diameter $c$=fiber diameter $a$+fiber diameter $b$−fiber diameter $\alpha$ This is the equipment for drawing a GRIN lens for performing the method for controlling a diameter of a GRIN lens fiber.

Specifically, when a distance between a measurement position of the diameter measuring instrument A and a measurement position of the diameter measuring instrument B in a GRIN lens path is d mm, and the drawing speed is V mm/second, the specified period of time T may be given by the following expression:

$$(d-20)/V \leq T \leq (d+20)/V$$

Below is a description of the equipment for drawing a GRIN lens fiber for performing the method for controlling a diameter of a GRIN lens fiber.

Specifically, the automatic controller that controls the drawing speed may include a PID controller, which is one of the most common automatic controllers. In this case, PI control or PID control using the PID controller is used to control the drawing speed.

In the present invention, the measurement position of the fiber diameter of the GRIN lens fiber inside the heating furnace using the diameter measuring instrument A is preferably a position where elongation of the preform has been almost completed. This position is typically a position away from the maximum temperature portion (the center of a heating portion) of a heater by 70 mm or further. This position changes in accordance with conditions such as a temperature in drawing and the drawing speed.

The measurement error of the diameter measuring instrument A derives from the fact that the diameter measuring instrument A is likely to be affected by the environment inside the heating furnace and the state of the fiber due to the shallow depth of focus of the lens used for the camera. Since the operation time of the GRIN lens fiber drawing is short, a significant change in the environment during the drawing does not frequently occur. Thus, the degree of variation is comparatively small compared to the variation in the fiber diameter. With regard to directions of the error, the errors tend to occur in one of the directions relative to a target diameter.

As described above, the position of the diameter measuring instrument A is a position where elongation of the preform has been almost completed, and at the position outside the furnace, at which the diameter measuring instrument B is disposed, the elongation is fully completed. Thus, the fiber diameters measured using the diameter measuring instruments A and B basically match to each other.

The distance between the positions at which diameter measuring instrument A and the diameter measuring instrument B are disposed are constant, and the specified period of time T required for the fiber to move from A to B is determined if the drawing speed is constant. Thus, it can be said that the fiber diameter b, which is a value measured at the moment when the fiber passes the diameter measuring instrument B, is the fiber diameter a measured a specified period of time T earlier using the diameter measuring instrument A.

With regard to a transition of the fiber diameter of the GRIN lens fiber during drawing, the variation in the fiber diameter is large at the start of the drawing operation, and the degree of variation is decreased using fiber diameter control. When the variation in the fiber diameter has been decreased, and the fiber diameter a is becoming closer to the target diameter, the degree of variation in the drawing speed also decreases. Thus, the time taken for the fiber to move from the diameter measuring instrument A to the diameter measuring instrument B falls within the following range:

$$(d-20)/V \leq T \leq (d+20)/V.$$

Thus, the fiber diameter can be corrected so as to become very close to an actual value of the fiber diameter at the measurement position of the fiber diameter $\alpha$. That is, the corrected fiber diameter c that is input to the automatic controller is very close to an actual value of the fiber diameter of the GRIN lens that has been almost elongated inside the heating furnace, and accordingly, preferable fiber diameter control can be performed.

When the variation in the fiber diameter during drawing is large and the drawing speed varies due to fiber diameter control, the difference between the fiber diameter b and the fiber diameter $\alpha$, which is measured using the diameter measuring instrument A the specified period of time T earlier, increases as long as the specified period of time T is fixed. Preferably, the fiber diameter is corrected when fiber diameter control stabilizes to some degree. Specifically, it is preferable that the correction is performed about 60 to 90 seconds after the start of drawing.

Advantages

In the method for controlling a diameter of a GRIN lens fiber and a fiber drawing equipment according the present invention, a fiber diameter that is very close to an actual value of the fiber diameter of the GRIN lens that has been almost elongated inside the heating furnace can be input to the automatic controller in order to control the fiber diameter. Thus, compared to the related-art method and equipment, the fiber diameter of the fabricated GRIN lens fiber is close to the target value and has a decreased variation, and accordingly, the GRIN lens fiber having fiber diameter errors within an allowable range can be fabricated while achieving a high yield.

Figure 1:
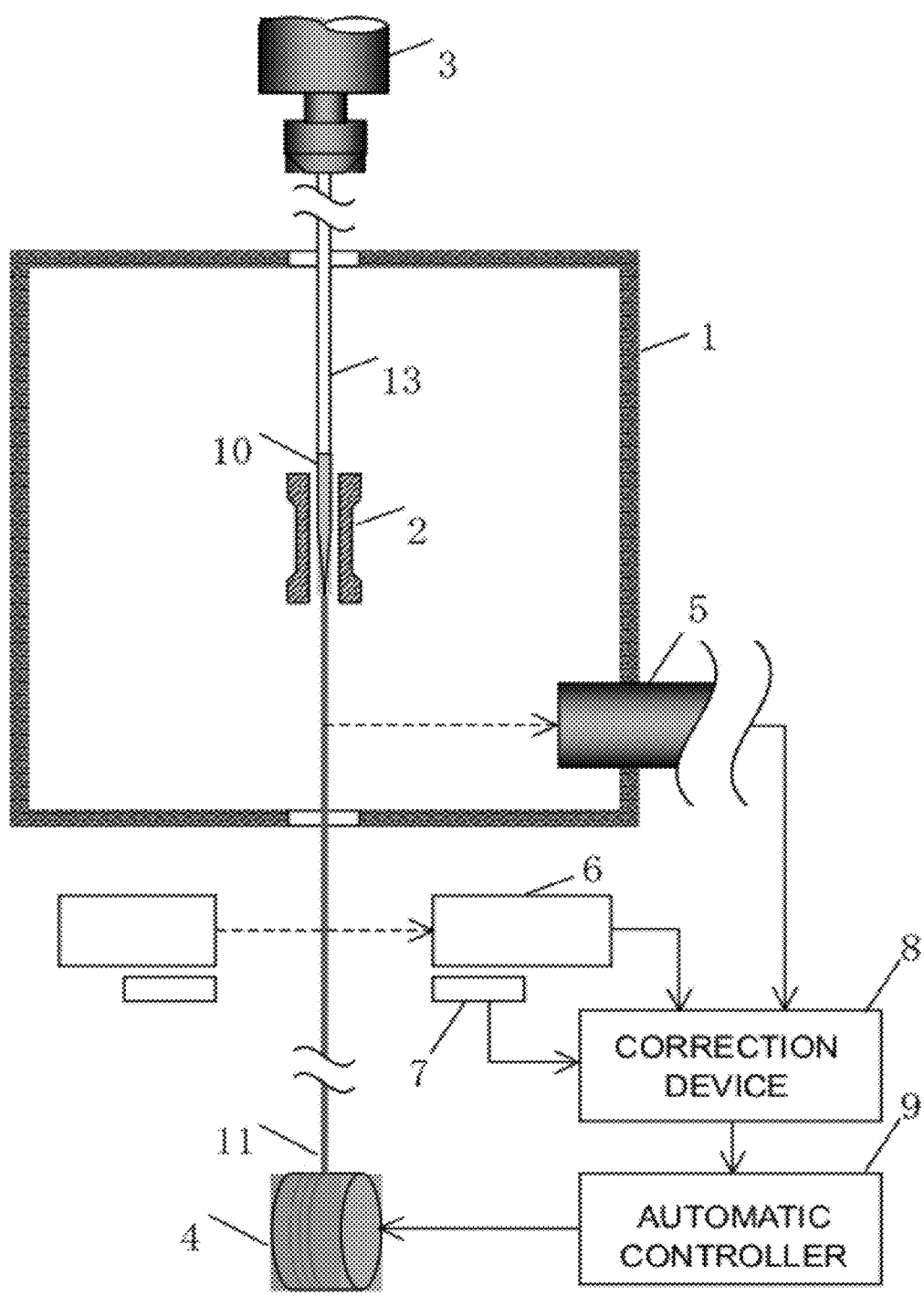
FIG. 1 is an explanatory view of equipment for drawing a GRIN lens according to an embodiment (when a drawing speed is controlled).

REFERENCE NUMERALS 1 heating furnace
2 heater
3 ascending/descending device
4 winding drum
5 diameter measuring instrument A
6 diameter measuring instrument B
7 sensor
8 correction device
9 automatic controller
10 preform
11 GRIN lens fiber
12 weight
13 silica rod

BEST MODE FOR CARRYING OUT THE INVENTION

Embodiment

Figure 2:
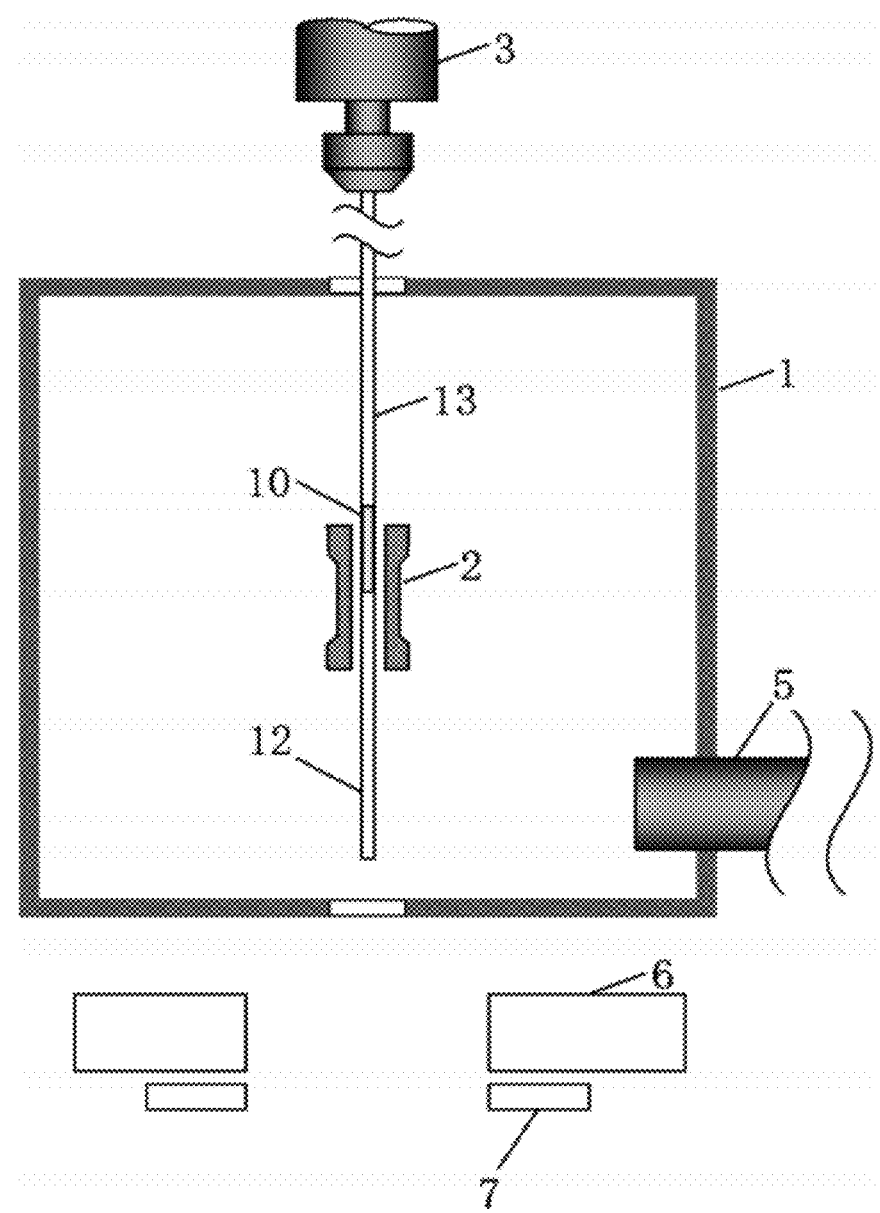
FIG. 2 is an explanatory view of the equipment for drawing a GRIN lens according to the embodiment (when a preform is set).
Figure 3:
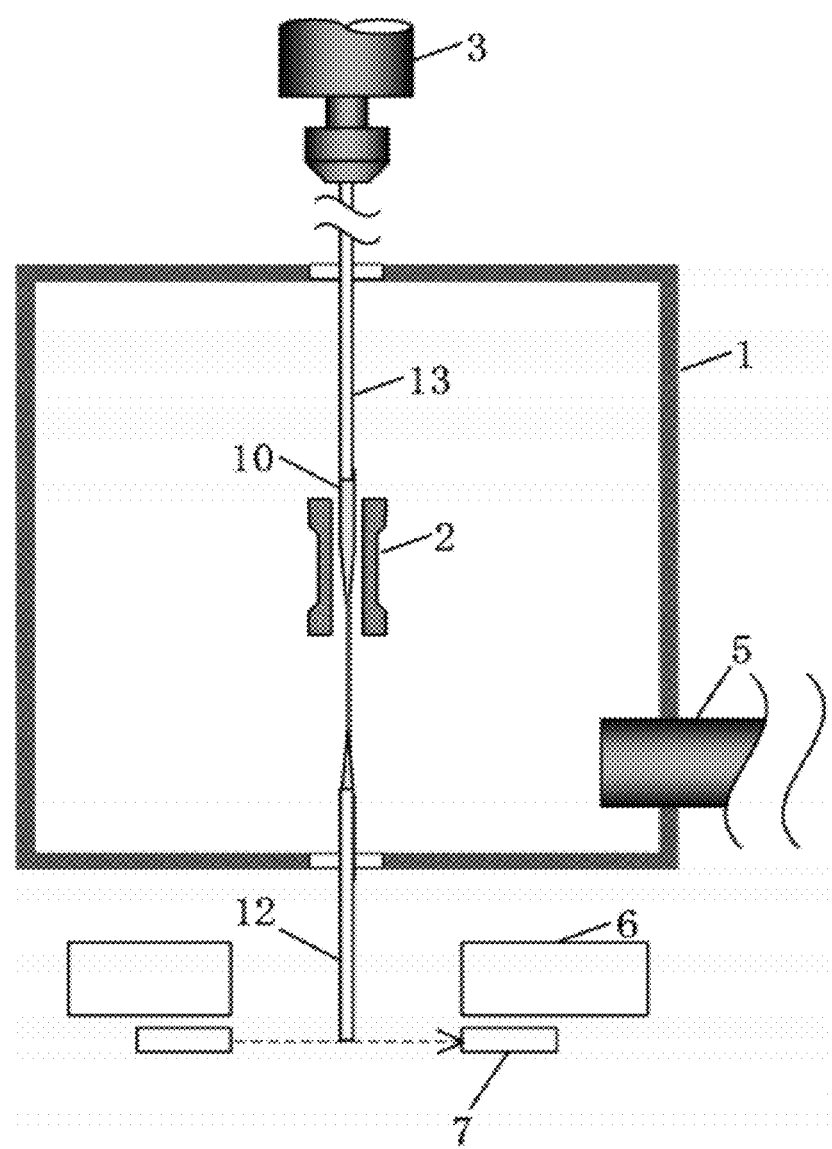
FIG. 3 is an explanatory view of the equipment for drawing a GRIN lens according to the embodiment (when a timer starts).

FIGS. 1 to 3 illustrate equipment for drawing a GRIN lens fiber according to an embodiment. This drawing equipment includes a heating furnace 1, a heater 2, an ascending/descending device 3, a winding drum 4, a diameter measuring instrument A (5), a diameter measuring instrument B (6), a sensor 7, a correction device 8, and an automatic controller 9.

The heating furnace 1 is a very high temperature vertical pipe furnace, the temperature of which can be increased up to 2100° C.

The winding drum 4 includes a horizontal movement mechanism that prevents a turn of a fiber from overlapping another turn of the fiber. In the present embodiment, a drawn GRIN lens is directly wound using the winding drum 4. By controlling a rotation speed of the winding drum 4, a drawing speed is controlled. A capstan roller may be provided before the winding drum in order to control the drawing speed by controlling a rotation speed of the capstan roller.

The diameter measuring instrument A (5) uses a commercial image processing device using a camera. The camera needs to be calibrated in advance using an object such as an optical fiber having a known dimension.

A fiber diameter a, which is measured using the diameter measuring instrument A, is transmitted to the correction device 8.

The diameter measuring instrument A (5) is provided at a position in which elongation of a GRIN lens fiber is substantially complete. In the present embodiment, the position is 80 mm below the center of a heating portion of the heater 2.

The diameter measuring instrument B (6) uses a commercial outer diameter measuring device of a light-blocking type. A fiber diameter b, which is measured using the diameter measuring instrument B, is transmitted to the correction device 8.

The measurement position of the diameter measuring instrument B (6) is preferably a position close to the exit of the heating furnace as much as possible. In the present embodiment, the measurement position of the diameter measuring instrument B (6) is positioned about 200 mm below the measurement position of the diameter measuring instrument A. Since the path of the GRIN lens fiber is vertical, the distance d in the GRIN lens fiber path between the measurement positions of the diameter measuring instrument A and the diameter measuring instrument B is about 200 mm.

As illustrated in FIG. 3, the sensor 7 detects that a lower end of a weight 12 has passed the sensor 7, and transmits a detection signal to the correction device 8.

The correction device 8 outputs to the automatic controller 9 a fiber diameter c in accordance with the fiber diameter a from the diameter measuring instrument A and the fiber diameter b from the diameter measuring instrument B.

The automatic controller 9 controls the rotation speed (the drawing speed) of the winding drum such that the fiber diameter c becomes c' which is closer to a specified target value. By controlling the rotation speed of the winding drum, the drawing speed at which the GRIN lens fiber is drawn is controlled.

A trigger of fiber diameter correction can be not only transmitted from the sensor 7 but also manually transmitted.

Next, the embodiment of a method for controlling a diameter of a GRIN lens according to the present invention will be described.

After the temperature of the heating furnace 1 has been increased up to a specified temperature, the winding drum 4 is caused to start rotation and a horizontal movement. A preform 10 with a silica rod 13 welded thereto is disposed in the ascending/descending device 3.

The ascending/descending device 3 is started to descend so as to descend the preform 10 to a specified position. This state is illustrated in FIG. 2. When the preform 10 is softened and the weight 12 is descended by a certain distance to a lower side of the heating furnace, the ascending/descending device 3 is started to descend at a constant speed. The descending speed is a constant speed that corresponds to the drawing speed of the GRIN lens.

As illustrated in FIG. 3, the moment when the lower end of the weight 12 passes the sensor 7, the detection signal of the sensor 7 is transmitted to the correction device 8. This turns on a timer of the correction device 8. The timer is set to count an appropriate time (85 seconds in the present embodiment) for the fiber diameter of the GRIN lens fiber having been drawn to stabilize. When the set time has elapsed (when the timer reaches 0), the correction device 8 performs correction of the fiber diameter a, and transmits the corrected value, the fiber diameter c, to the automatic controller 9. Before the timer reaches 0, the difference between the fiber diameter a and the fiber diameter b is not calculated, and a+0 is set to the fiber diameter c.

When the weight 12 is descended near the winding drum 4, the weight 12 is detached, an end of an elongated part is attached to the winding drum 4 using adhesive tape, and winding and drawing begin. Also at this time, automatic controller 9 is started.

An average rotation speed of the winding drum 4 for a preform having a particular diameter is set so as to correspond to a ratio between a feeding speed and a target diameter. However, before the timer reaches 0, the difference between the fiber diameter a and the fiber diameter b is not calculated. Therefore, the automatic controller 9 performs automatic control in accordance with the fiber diameter c to which a+0 is set. Thus, the average rotation speed of the winding drum 4 constantly changes.

After 54 seconds from the start of drawing, the fiber diameter was stabilized by the automatic control. When 85 seconds had elapsed and the timer reached 0, the correction device 8 started correction. At this time, the fiber diameter a, which was a measured value using the diameter measuring instrument a, was 125.3 μm. The fiber diameter b, which was a measured value using the diameter measuring instrument B, was 121.7 μm, a value that was smaller than the fiber diameter a by 3.6 μm. Thus, it is observed that the measured value using the diameter measuring instrument A has an error.

The correction is performed by calculating the fiber diameter c that is obtained by adding a difference (fiber diameter b−fiber diameter α) to the fiber diameter a, where α is a fiber diameter measured using the diameter measuring instrument A before T seconds, a specified period of time. That is, fiber diameter c=fiber diameter a+fiber diameter b−fiber diameter α. The fiber diameter c is transmitted from the correction device 8 to the automatic controller 9, where the automatic correction is performed such that the fiber diameter c becomes closer to the target value of 124.5 μm. In the present embodiment, the specified period of time T varies between the 1.9 to 1.99 seconds in 10 ms. Since the drawing speed V is about 106.7 mm/second, and the distance d between the measurement position of the diameter measuring instrument A and the measurement position of the diameter measuring instrument B is about 200 mm, T varies substantially in the following range:

$$(d-12.3)/V \leq T \leq (d-2.7)/V$$

That is, T falls within (d±20)/V, and the distance in the GRIN lens between the measurement positions of the fiber diameter b and the fiber diameter α is within ±20 mm. Thus, fiber diameter control can be performed substantially without problems.

In several seconds after the correction has started, the fiber diameter b (an actual fiber diameter of the GRIN lens fiber) substantially falls within a range of 124.5±1 μm. Thus, a fiber having a desirable fiber diameter can be obtained.

Figure 4:
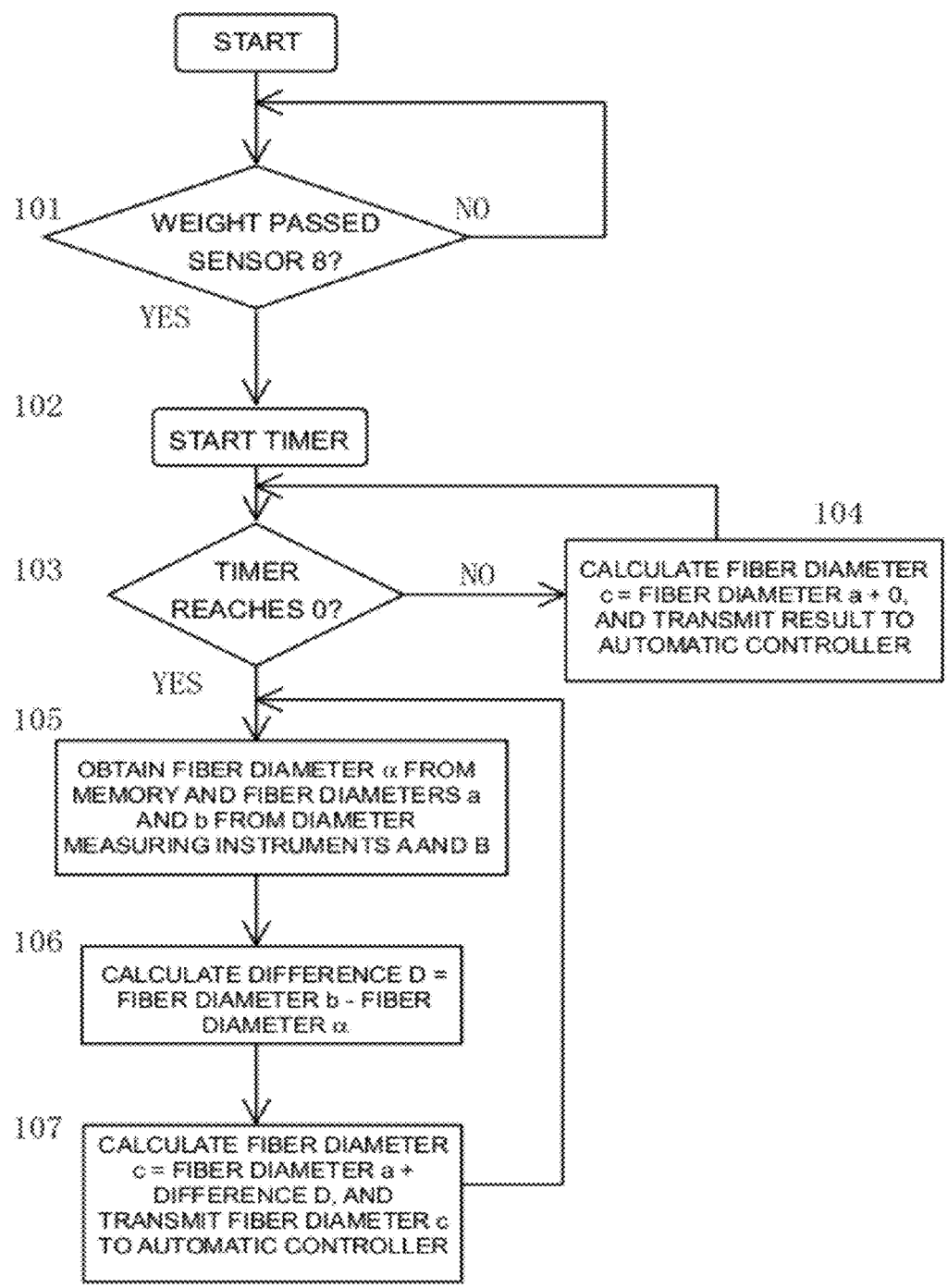
FIG. 4 is a flowchart of a correction device.

Referring to FIG. 4, a program of the correction device 8 will be described below.

After the program is started, whether or not the lower end of the weight 12 reaches the sensor 7 as illustrated in FIG. 3 is determined in step 101, "WEIGHT 12 PASSED SENSOR 7?" If a "NO" is returned, step 101 is repeated and a waiting state is entered until the lower end of the weight 12 reaches the sensor 7. If a "YES" is returned, the program proceeds to step 102.

In step 102, a "START TIMER" operation is performed in order to turn "ON" the timer included in the correction device 8. A period of time suitable to stabilizing the fiber diameter of the drawn GRIN lens fiber (85 seconds in the present embodiment) has been set to the timer.

In step 103, "TIMER REACHES 0?", whether or not the set period of time (85 seconds) has elapsed is determined. If "NO" is returned, the program proceeds to step 104. If "YES" is returned, the program proceeds to a correction operation beginning in step 105.

In step 104, an operation of "OBTAIN FIBER DIAMETER c (FIBER DIAMETER a+0) FROM CORRECTION DEVICE 8 AND TRANSMIT FIBER DIAMETER c TO AUTOMATIC CONTROLLER 9" is performed. At this time, since the correction operation (difference D=fiber diameter b−fiber diameter α) has not been performed, the difference D is 0, and the fiber diameter a obtained from the diameter measuring instrument A is transmitted to the automatic controller 9 as the fiber diameter c. This operation is repeated at intervals of 10 ms until the timer reaches 0. The automatic controller performs automatic control such that the fiber diameter a transmitted from the correction device becomes closer to a preset target value of 124.5 mm.

After it has been determined that the timer reaches "0" in step 103, an "OBTAIN FIBER DIAMETER α FROM MEMORY AND FIBER DIAMETERS a and b FROM DIAMETER MEASURING INSTRUMENTS A and B" operation is performed in step 105.

The memory is included in the correction device. In the memory, 20 fiber diameters a, which have been transmitted from the diameter measuring instrument A at intervals of 100 ms, are sequentially stored. When the number of the transmitted fiber diameters a exceeds 20, the fiber diameters a are sequentially discarded from the top (first stored). That is, the fiber diameter A stored in the top location is measured 1.9 seconds before the last stored fiber diameter a. Since the fiber diameter α (fiber diameter a stored in the top location) is obtained in every 10 ms (0.01 seconds), the fiber diameter α to be obtained is a fiber diameter measured 1.9 to 1.99 seconds before. At the same time, the present fiber diameters a and b are obtained from the diameter measuring instruments A and B.

In step 106, "COMPUTE DIFFERENCE D=FIBER DIAMETER b−FIBER DIAMETER α", the difference D is computed.

The fiber diameter b is a measured value presently measured using the diameter measuring instrument B. The fiber diameter α is a measured value of a part of the GRIN lens near a part where the fiber diameter b is measured using the diameter measuring instrument A 1.9 to 1.99 seconds earlier. The fiber diameter b is correctly measured. Since the fiber diameter α is measured in the furnace, it is highly probable that the measured value is incorrect. "DIFFERENCE D=FIBER DIAMETER b−FIBER DIAMETER α" equals to a measurement error of the diameter measuring instrument A.

In step 107, a "COMPUTE FIBER DIAMETER c=FIBER DIAMETER a+DIFFERENCE D AND TRANSMIT FIBER DIAMETER c TO AUTOMATIC CONTROLLER" operation is performed.

The fiber diameter c is obtained by correcting the fiber diameter α presently measured using the diameter measuring instrument A so as to eliminate (or reduce) the measurement error. Thus, the fiber diameter c represents an almost correct fiber diameter at the measurement position of the diameter measuring instrument A. The fiber diameter c is transmitted to the automatic controller 9, which then performs automatic control such that the fiber diameter c transmitted from the correction device becomes closer to a preset target value of 124.5 mm.

Steps 105 to 107 are repeatedly performed at intervals of 10 ms, and the fiber diameter c is transmitted to the automatic controller at intervals of 10 ms.

As described above, according to the present invention, the fiber diameter of the preform in the heating furnace at a part that has been almost completely elongated (fiber diameter c) can be correctly measured. By performing automatic control in accordance with this fiber diameter, the acceptable product ratio (yield) is significantly improved compared to the related art method.

Table 1 shows the results of drawing performed five times in accordance with the above-described embodiment. Table 2 shows the results of comparative examples in which drawing is performed five times using a related-art automatic control method (other conditions are the same as those of the embodiment). In the related-art method, automatic control is performed only on the basis of the fiber diameter b measured using the diameter measuring instrument B installed outside the heating furnace.

TABLE 1

|  | Acceptable product ratio (%) |
| --- | --- |
| Example 1 | 53.20 |
| Example 2 | 59.19 |
| Example 3 | 71.89 |
| Example 4 | 78.61 |
| Example 5 | 54.77 |
| Average | 63.53 |

TABLE 2

|  | Acceptable product ratio (%) |
| --- | --- |
| Comparative example 1 | 42.81 |
| Comparative example 2 | 24.94 |
| Comparative example 3 | 43.32 |
| Comparative example 4 | 31.81 |
| Comparative example 5 | 48.14 |
| Average | 38.20 |

In Tables 1 and 2, "Acceptable product ratio" represents the ratio of a length that is compliant with the specification (target diameter±1.0 μm) to the entire length in percentage. As clearly seen from Tables 1 and 2, the acceptable product ratio increases by 25% on average according to the present invention compared to that with the related art method.

The invention claimed is:

1. A method of controlling an outer diameter of a GRIN lens fiber, the method comprising:
   (I) drawing said GRIN lens fiber from a preform, said drawing including:
     (i) increasing a temperature of a furnace, wherein said furnace surrounds and encloses a region where said preform of said GRIN lens fiber is softened, and a heater is disposed inside said furnace and surrounds said region;
     (ii) welding said preform to a silica rod, lowering said welded preform inside said heater, and heating and softening said welded preform;
     (iii) elongating said softened preform, as said GRIN lens fiber; and
     (iv) winding said GRIN lens fiber onto a winding drum disposed below and outside said furnace;
   (II) measuring said GRIN lens fiber, said measuring including:
     (i) measuring an outer diameter a of said GRIN lens fiber during said drawing said GRIN lens fiber from said preform, at a first measurement position located below and outside said heater and inside said furnace; and
     (ii) measuring an outer diameter b of said GRIN lens fiber during said drawing said GRIN lens fiber from said preform, at a second measurement position located below and outside said furnace and forward of said winding drum; and
   (III) correcting and controlling said GRIN lens fiber, said correcting and controlling including:
     using a value b and a value a from a memory, included in a correction device, that stores values of said outer diameter a and said outer diameter b of said GRIN lens fiber obtained from said measuring said GRIN lens fiber, and obtaining a difference D between said value a and said value b where $D=b-\alpha$,
       wherein said value b is said outer diameter of said GRIN lens fiber measured at said second measurement position at a certain time, and said value $\alpha$ is said outer diameter of said GRIN lens fiber measured at said first measurement position at a time that is a period T before said certain time;
     (ii) correcting a measurement error of said measured outer diameter a at said first measurement position at said time by said difference D, obtaining a corrected outer diameter c where $c=a+D=a+b-\alpha$, and transmitting said corrected outer diameter c to an automatic controller; and
     (iii) controlling a drawing speed by controlling a rotation speed of said winding drum by said automatic controller, so as to obtain a corrected outer diameter c' which is closer to a target value than said corrected outer diameter c.

2. The method of claim 1, wherein:
said period T (sec) is within a range of $(d-20)/V \le T \le (d+20)/V$, where d (mm) is a distance between said first measurement position and said second measurement position, and V (mm/sec) is said drawing speed.

3. The method of claim 1, wherein:
said first measurement position is positioned below and away from a center of a heating portion of said heater by 70 mm or more and inside said furnace.

4. The method of claim 1, wherein:
a distance between said first measurement position and said second measurement position is 200 mm.

* * * * *